US012645573B2

(12) United States Patent　　　　　(10) Patent No.:　US 12,645,573 B2
Badrinath et al.　　　　　　　　　　　(45) Date of Patent:　　　Jun. 2, 2026

(54) TESTING INTEGRATION TESTING QUALITY VIA CRITICAL USER JOURNEYS (CUJs)

(71) Applicant: Google LLC, Mountain View, CA (US)

(72) Inventors: Srinath Badrinath, Bengaluru (IN);
Rachana Jayaram, Bangalore (IN);
Pawan Dogra, Bengaluru (IN);
Aishwarya Poomuttam Sreedas,
Bangalore (IN); Anand Bodiwala,
Banglore (IN); **Gagandeep Brijmohan
Gupta**, Bengaluru (IN)

(73) Assignee: Google LLC, Mountain View, CA (US)

( * ) Notice: Subject to any disclaimer, the term of this
patent is extended or adjusted under 35
U.S.C. 154(b) by 295 days.

(21) Appl. No.: 18/535,155

(22) Filed: Dec. 11, 2023

(65) Prior Publication Data

US 2025/0190334 A1　　Jun. 12, 2025

(51) Int. Cl.
G06F 11/3668　　(2025.01)
G06F 8/74　　　(2018.01)
G06F 9/54　　　(2006.01)

(52) U.S. Cl.
CPC ............ G06F 11/3688 (2013.01); G06F 8/74
(2013.01); G06F 9/547 (2013.01); **G06F
11/3676 (2013.01); G06F 11/3684** (2013.01)

(58) Field of Classification Search
CPC ........ G06F 11/3688; G06F 8/74; G06F 9/547;
G06F 11/3676; G06F 11/3684
USPC ........................................................ 717/131
See application file for complete search history.

(56) References Cited

U.S. PATENT DOCUMENTS

| | | | | |
|---|---|---|---|---|
| 10,372,597 | B2 * | 8/2019 | Alam ................... | G06F 11/3684 |
| 11,269,876 | B1 * | 3/2022 | Basavaiah ................. | G06F 8/77 |
| 11,347,625 | B1 * | 5/2022 | Agarwal ............. | G06F 11/3466 |
| 12,001,426 | B1 * | 6/2024 | Basavaiah ............. | G06F 16/212 |
| 12,293,272 | B1 * | 5/2025 | Poulis .................... | G06N 3/042 |
| 2005/0193269 | A1 * | 9/2005 | Haswell .............. | G06F 11/3684 |
| | | | | 714/E11.208 |

(Continued)

FOREIGN PATENT DOCUMENTS

| | | |
|---|---|---|
| CN | 105975397 A | 9/2016 |
| CN | 115033471 A | 9/2022 |

OTHER PUBLICATIONS

Arguelles, Carlos, et al. "Critical user journey test coverage."
(2020). pp. 1-8 (Year: 2020).*

(Continued)

*Primary Examiner* — Satish Rampuria
(74) *Attorney, Agent, or Firm* — Shumaker & Sieffert,
P.A.

(57) ABSTRACT

A method for improving integration testing quality includes
accessing a software module and determining a plurality of
critical user journeys (CUJs) in the software module. The
method also includes obtaining a set of CUJ tests corre-
sponding to the software module, each CUJ test of the set of
CUJ tests testing at least one CUJ. The method also includes,
for a first CUJ of the plurality of CUJs, determining that the
set of CUJ tests fails to include a CUJ test that tests the first
CUJ, and, in response to determining that the set of CUJ
tests fails to include the CUJ test that tests the first CUJ,
generating, a first CUJ test testing the first CUJ. The method
includes adding the first CUJ test to the set of CUJ tests. The
method also includes testing the plurality of CUJs using the
set of CUJ tests.

16 Claims, 5 Drawing Sheets

(56) References Cited

U.S. PATENT DOCUMENTS

| | | | | |
|---|---|---|---|---|
| 2010/0088683 A1* | 4/2010 | Golender | ............. | G06F 11/323 |
| | | | | 717/128 |
| 2018/0349257 A1* | 12/2018 | Bhattacharjee | ........... | G06F 8/41 |
| 2019/0155721 A1 | 5/2019 | Reeve et al. | | |
| 2022/0229957 A1 | 7/2022 | Venugopal et al. | | |
| 2022/0351054 A1* | 11/2022 | Subramanian | ......... | G06N 5/025 |
| 2022/0398603 A1 | 12/2022 | Manivannan et al. | | |

OTHER PUBLICATIONS

Myllärniemi, Varvana, et al. "Development as a journey: factors supporting the adoption and use of software frameworks." Journal of software engineering research and development 6.1 (2018): pp. 1-22. (Year: 2018).*
Oki, Brian, et al. "The information bus: an architecture for extensible distributed systems." Proceedings of the fourteenth ACM symposium on Operating systems principles. 1993. pp. 58-68. (Year: 1993).*
Makamure, Chipo, and Zingiswa MM Jojo. "Assessment of Visuo-Semiotic Skills for Pre-Service Teachers in Coordinate Geometry." Acta Didactica Napocensia 15.1 (2022): pp. 74-91. (Year: 2022).*
Cleland-Huang, Jane, et al. "Software traceability: trends and future directions." Future of software engineering proceedings. 2014. pp. 55-69. (Year: 2014).*
Parnas, David L., A. John Van Schouwen, and Shu Po Kwan. "Evaluation of safety-critical software." Communications of the ACM 33.6 (1990): pp. 636-648. (Year: 1990).*

\* cited by examiner

TESTING INTEGRATION TESTING QUALITY VIA CRITICAL USER JOURNEYS (CUJs)

TECHNICAL FIELD

This disclosure relates to a method to improve integration testing quality.

BACKGROUND

Software integration is when two separate software modules are combined. For example, an add-on software module can be incorporated into a larger program. However, when combining two software modules, there are many unexpected problems that may arise. Integration testing is the process of testing critical user journeys (CUJs) in the integrated software module to find bugs or fail points.

SUMMARY

One aspect of the disclosure provides a computer-implemented method for integration testing quality improvement. The computer-implemented method is executed by data processing hardware that causes the data processing hardware to perform operations including accessing a software module. The operations include determining a plurality of critical user journeys (CUJs) in the software module. Each CUJ of the plurality of CUJs defines a user path for a user through the software module during interaction with the software module. The operations also include obtaining a set of CUJ tests corresponding to the software module, each CUJ test of the set of CUJ tests testing at least one CUJ. The operations also include, for a first CUJ of the plurality of CUJs, determining that the set of CUJ tests fails to include a CUJ test that tests the first CUJ, and, in response to determining that the set of CUJ tests fails to include the CUJ test that tests the first CUJ, generating, a first CUJ test testing the first CUJ. The operations include adding the first CUJ test to the set of CUJ tests. The operations further include testing the plurality of CUJs using the set of CUJ tests.

Implementations of the disclosure may include one or more of the following optional features. In some implementations, the software module includes an integrated software module. In some implementations, the operations further include for a second CUJ test of the set of CUJ tests, determining that the second CUJ test is redundant based on a third CUJ test of the set of CUJ tests, and removing the second CUJ test from the set of CUJ tests. In these implementations, determining that the second CUJ test is redundant based on the third CUJ test may include determining that the at least one CUJ of the plurality of CUJs tested by the second CUJ test is also tested by the third CUJ test.

In some implementations, the operations further include for a second CUJ test of the set of CUJ tests, determining that at least one CUJ of the plurality of CUJs tested by the second CUJ test does not belong to the plurality of CUJs, and removing the second CUJ test from the set of CUJ tests. Generating the first CUJ test testing the first CUJ may include reverse engineering a remote procedure call (RPC) trace corresponding to the first CUJ test. The operations may further include ranking the plurality of CUJs based on an occurrence frequency In some implementations, the operations further include for each respective CUJ test of the set of CUJ tests, generating a respective tree graph to represent the respective CUJ test. In these implementations, the operations may further include, for each respective CUJ test of the set of CUJ tests, comparing the respective tree graph of the respective CUJ test to another respective tree graph for another respective CUJ test of the set of CUJ tests, and, determining, based on the comparison of the respective tree graph of the respective CUJ test to the other respective tree graph for the other respective CUJ test of the set of CUJ tests, a similarity score for the respective CUJ test and the other respective CUJ test. In these implementations, the operations may further include clustering the CUJ tests of the set of CUJ tests based on the respective similarity scores.

Another aspect of the disclosure provides a system for integration testing quality improvement. The system includes data processing hardware and memory hardware in communication with the data processing hardware. The memory hardware stores instructions that when executed on the data processing hardware cause the data processing hardware to perform operations. The operations include accessing a software module. The operations include determining a plurality of critical user journeys (CUJs) in the software module. Each CUJ of the plurality of CUJs defines a user path for a user through the software module during interaction with the software module. The operations also include obtaining a set of CUJ tests corresponding to the software module, each CUJ test of the set of CUJ tests testing at least one CUJ. The operations also include, for a first CUJ of the plurality of CUJs, determining that the set of CUJ tests fails to include a CUJ test that tests the first CUJ, and, in response to determining that the set of CUJ tests fails to include the CUJ test that tests the first CUJ, generating, a first CUJ test testing the first CUJ. The operations include adding the first CUJ test to the set of CUJ tests. The operations further include testing the plurality of CUJs using the set of CUJ tests.

This aspect may include one or more of the following optional features. In some implementations, the software module includes an integrated software module. In some implementations, the operations further include for a second CUJ test of the set of CUJ tests, determining that the second CUJ test is redundant based on a third CUJ test of the set of CUJ tests, and removing the second CUJ test from the set of CUJ tests. In these implementations, determining that the second CUJ test is redundant based on the third CUJ test may include determining that the at least one CUJ of the plurality of CUJs tested by the second CUJ test is also tested by the third CUJ test.

In some implementations, the operations further include for a second CUJ test of the set of CUJ tests, determining that at least one CUJ of the plurality of CUJs tested by the second CUJ test does not belong to the plurality of CUJs, and removing the second CUJ test from the set of CUJ tests. Generating the first CUJ test testing the first CUJ may include reverse engineering a remote procedure call (RPC) trace corresponding to the first CUJ test. The operations may further include ranking the plurality of CUJs based on an occurrence frequency In some implementations, the operations further include for each respective CUJ test of the set of CUJ tests, generating a respective tree graph to represent the respective CUJ test. In these implementations, the operations may further include, for each respective CUJ test of the set of CUJ tests, comparing the respective tree graph of the respective CUJ test to another respective tree graph for another respective CUJ test of the set of CUJ tests, and, determining, based on the comparison of the respective tree graph of the respective CUJ test to the other respective tree graph for the other respective CUJ test of the set of CUJ tests, a similarity score for the respective CUJ test and the other respective CUJ test. In these implementations, the operations may further include clustering the CUJ tests of the set of CUJ tests based on the respective similarity scores The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In a microservice world, where software modules are created, combined, and/or updated frequently, it becomes increasingly difficult to sustain high quality integration testing as integration tests have to be constantly updated and, more importantly, the testability fixtures must also be updated. In other words, as software is updated/changed, corresponding critical user journeys (CUJs) are added, deleted, and/or changed. Critical user journeys define user paths for users through a software module while the user interacts with the software module. Thus, the integration testing needs to change to capture the current CUJs of the software.

Furthermore, as the number of tests increases, it becomes more difficult to understand the value of each individual test. However, the value of each test is important as the software needs to be tested before it is released. If there is no distinction between the tests, then the only way to ensure that the software is comprehensively tested is either to execute all tests or to generate completely new tests for the software. Executing all tests can be computationally expensive and take a prolonged amount of time (e.g., one test for one CUJ is estimated to take an hour or more), especially as a number of tests likely will be redundant and/or at least partially overlap. Further, generating all new tests would be impractical, costly, and time consuming.

Implementations herein are directed to a method to improve integration testing quality. In particular, an integration module is configured to improve the quality of overall testing and fidelity of individual tests by generating tests automatically for untested CUJs, removing redundant and/or obsolete tests, replacing expensive tests with one or more less expensive tests, and generating visualizations of CUJs and CUJ tests.

Figure 1:
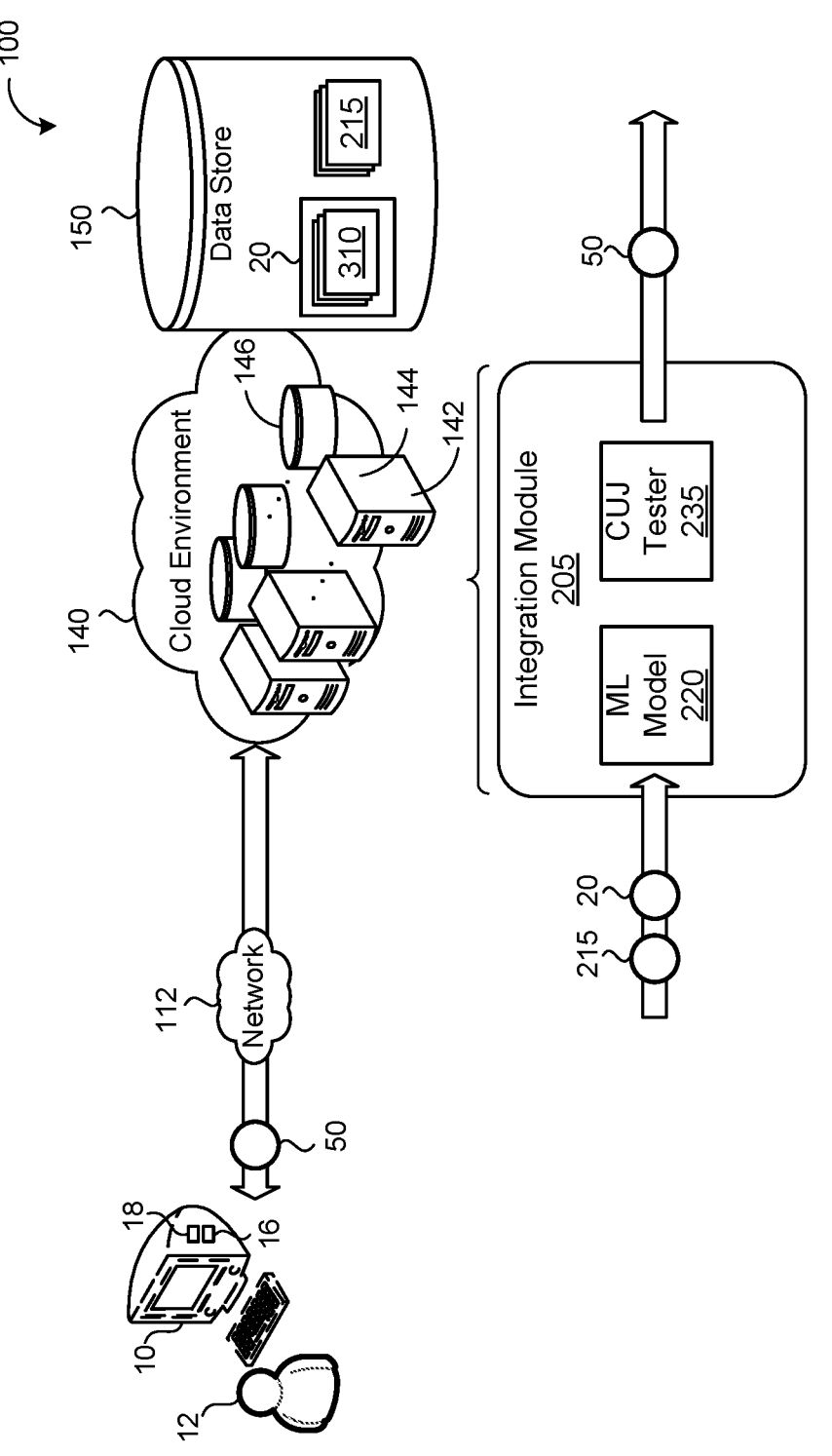
FIG. 1 is a schematic view of an example system for improving integration testing quality.

Referring to FIG. 1, in some implementations, an integration testing quality improvement system 100 includes a cloud environment 140 (e.g., a high-performance remote server or cluster of high-performance remote servers) in communication with one or more client devices 10 via a network 112. The client device 10 may correspond to any computing device, such as a desktop workstation, a laptop workstation, or a mobile device (i.e., a smart phone). The client device 10 includes computing resources 18 (e.g., data processing hardware) and/or storage resources 16 (e.g., memory hardware). The cloud environment 140 may be a remote environment that is accessible by one more devices through the Internet.

The cloud environment 140 may be a single computer, multiple computers, or a distributed system having scalable/elastic resources 142 including computing resources 144 (e.g., data processing hardware) and/or storage resources 146 (e.g., memory hardware). The cloud environment 140 may be configured to execute an integration module 205 for improving integration testing quality and performance. A data store 150 (i.e., a remote storage device) may be overlain on the storage resources 146 to allow scalable use of the storage resources 146 by one or more of the clients (e.g., the client device 10) or the computing resources 144 (e.g., the integration module 205). The data store 150 is configured to store a software module 20 including one or more critical user journeys (CUJs) 310 and one or more CUJ tests 215. A CUJ 310 is a path and/or use case that a user can traverse while interacting with the software module 20. For example, in an email software application, one CUJ 310 adds an attachment to an email while another CUJ 310 schedules an email to be sent at a specific time and date. In some implementations, the software module 20 is an integrated software module 20 including a combination of two or more software components that are integrated together. A CUJ test 215 tests one or more CUJs 310 of a software module 20.

The cloud environment 140 executes the integration module 205 for improving integration testing quality and performance. The integration module 205 may obtain the software module 20, the CUJs 310, and/or the CUJ tests 215. In some implementations, the integration module 205 identifies the CUJs 310 for a software module 20. In these implementations, the integration module 205 may identify the CUJs 310 by performing remote procedure call (RPC) tracing to navigate through the various user journeys of the software module 20.

Figure 2:
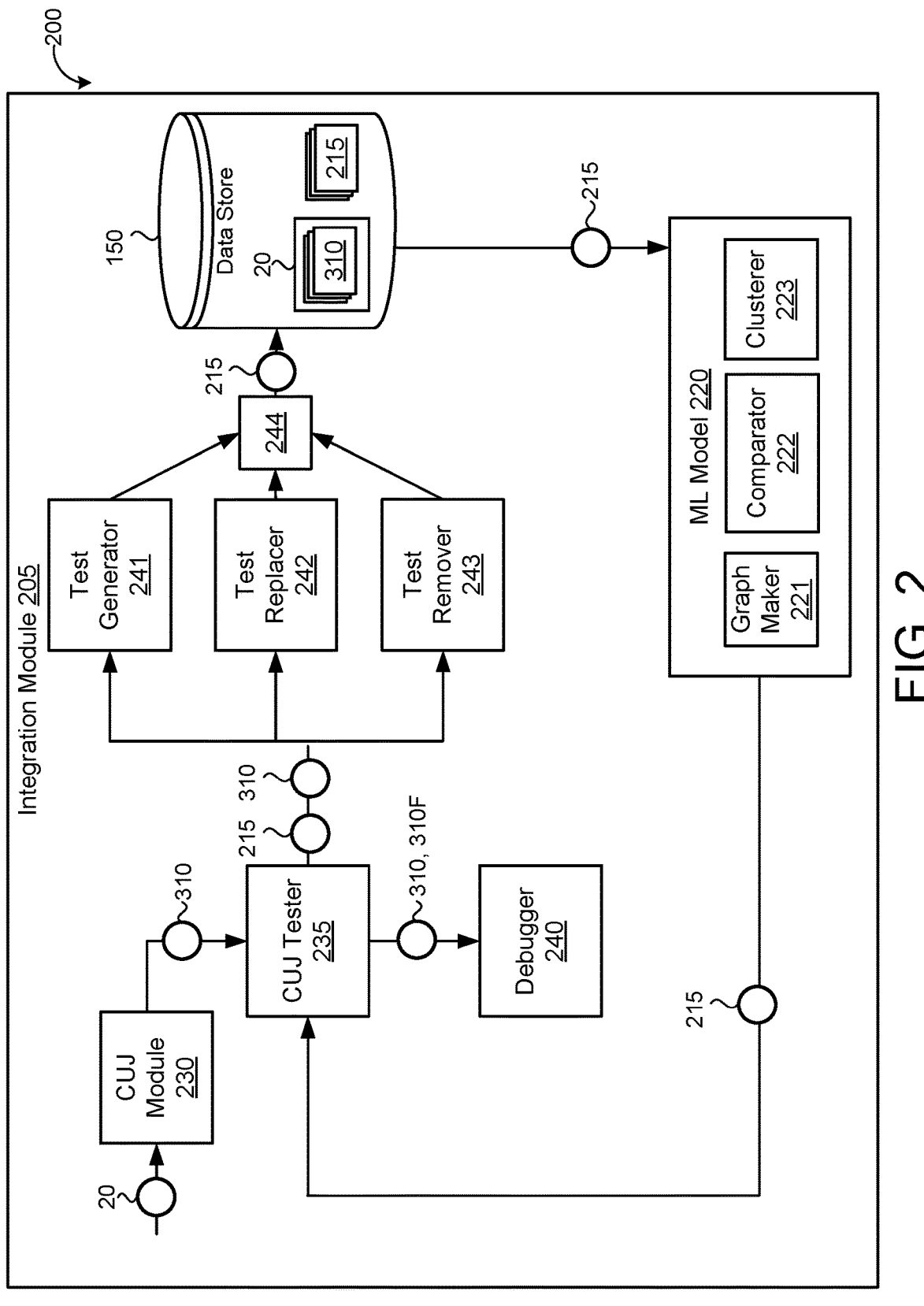
FIG. 2 is a schematic view of an integration module for improving integration testing quality.

The integration module 205 may implement a model 220 (e.g., a machine learning model, a graph analyzer using heuristics, etc.) that can be trained to evaluate CUJ test 215, compare CUJ tests 215, and/or generate new CUJ tests 215. In some implementations, the model 220 receives the existing CUJ tests 215 that are stored in the data store 150. The model 220 may be configured to generate one or more visual representations and or graphs for each CUJ test 215. The model 220 may also be used to compare the CUJ tests 215 and cluster similar CUJ tests 215, as discussed in greater detail below (FIG. 2).

The integration module 205, using the model 220 and/or other components, may be configured to compare each of the CUJ tests 215 to remove any tests that are redundant (i.e., if two CUJ tests 215 are identical, the integration module 205 deletes one). Further, if two CUJ tests 215 overlap in their testing (i.e., test the same or similar features), the integration module 205 can remove one CUJ test 215 and generate a new CUJ test 215 to cover the non-overlapping features of the removed CUJ test 215. For example, if a first CUJ test 215 tests features A and B (e.g., CUJs 310 A and B) of a software module 20, and a second CUJ test 215 tests features B and C of the software module 20, the integration module 205 can delete the second CUJ test 215 and generate a third CUJ test 215 that only tests feature C of the software module 20, thereby reducing redundancy in testing. Further, the integration module 205 may remove CUJ tests 215 that are not relevant to the software module 20 and/or add CUJ tests 215 corresponding to CUJs 310 that do not have a corresponding CUJ test 215 in the data store 150. Further, the integration module 205 may replace an expensive CUJ test 215 with one or more less expensive CUJ tests 215 to reduce the load on the system when executing the CUJ tests 215.

In some implementations, the integration module 205 traverses through each CUJ 310 of the software module 20 to ensure that there is a corresponding CUJ test 215. Further, the integration module 205 may traverse through the set of CUJ tests 215 to remove CUJ tests 215 that are redundant, expensive, and/or unnecessary. In other words, the integration module 205 may add, remove, and/or edit CUJ tests 215 until the set of CUJ tests 215 optimally covers each CUJ 310 of the software module 20. The integration module 205 may then execute, via a CUJ tester 235, the CUJ tests 215 on the software module 20. In some implementations, the integration module 205 also generates a visualization 50 to present to the user 12. For example, the visualization includes a tree diagram illustrating one or more CUJs 310 and/or one or more CUJ tests 215. Alternatively, the visualization 50 may include an alert of one or more CUJs 310 of the software module 20 that need to be fixed/debugged and a corresponding cause of the issue.

The system 100 of FIG. 1 is presented for illustrative purposes only and is not intended to be limiting. For example, although only a single example of each component is illustrated, the system 100 includes any number of components 10, 140, 150, and 205. Further, although some components are described as being located in the cloud environment 140, in some implementations, some or all of the components are hosted locally on the client device 10. Further, in various implementations, some or all of the components 150 and 205, are hosted locally on client device 10, remotely (such as in the cloud environment 140), or some combination thereof.

FIG. 2 is a schematic view 200 of an example integration module 205 for improving integration testing quality. The integration module 205 includes a model 220. The model 220 may receive CUJ tests 215 from a data store 150. The model 220 may include a graph maker 221 that is configured to generate a visual and/or schematic representation of the CUJ tests 215. For example, the graph maker 221 generates a respective tree diagram representative of a corresponding CUJ test 215, as discussed in greater detail below, FIG. 3. Though not illustrated, the graph maker 221 may also be configured to generate a visual/schematic view of one or more CUJs 310 of the software module 20. In some implementations, one or more outputs from the graph maker 221 are transmitted as a visualization 50 to a user.

The model 220 may also include a comparator 222 that is configured to compare CUJ tests 215. For example, the comparator 222 can compare a pair of CUJ tests 215 to determine a similarity score and/or to determine if the pair of CUJ tests 215 overlap or are redundant. In some implementations, the comparator 222 compares CUJ tests 215 by comparing the respective tree diagrams (generated by the graph maker 221) corresponding to each CUJ test 215 of the pair of CUJ tests 215. The model 220 may also include a clusterer 223 to generate a clustered representation of the set of CUJ tests 215. For example, the clusterer 223 receives similarity scores from the comparator 222 and then generates a cluster graph depicting the CUJ tests 215. The cluster graph may be a baseline data set (source of truth) for measuring the testing quality of all the CUJ tests 215. In some implementations, the cluster graph is transmitted to a user as a visualization 50 of the CUJ tests 215.

Further, a CUJ module 230 may receive a software module 20 and identify one or more CUJs 310 of the software module 20. For example, the CUJ module 230 is configured to implement remote procedure call (RPC) traces to identify paths through the software module 20. In some implementations, the CUJ module 230 ranks the CUJs 310 based on use, prevalence, occurrence frequency, or likelihood of error of the CUJs 310. In turn, the integration module 205 may identify CUJ tests 215 for the highest ranked CUJs 310 first.

A CUJ tester 235 may receive the CUJ tests 215 and the CUJs 310. The CUJ tester 235 may be configured to execute the set of CUJ tests 215 within the software module 20. In some implementations, the CUJ tester 235 determines that one or more CUJs 310 do not have a corresponding CUJ test 215. In some implementations the CUJ tester identifies a flawed CUJ 310, 310F. The CUJ tester 235 may transmit the failed CUJ 310F to a debugger 240 to automatically debug the software module 20 at the flawed CUJ 310F. In some implementations, the CUJ tester 235 transmits the failed CUJ 310F as a visualization 50 to a user.

Further, the CUJ tester 235 may determine that certain CUJ tests 215 are redundant, overlap, are computationally expensive, or unnecessary. The CUJ tester 235 may then transmit the CUJ tests 215 and the CUJs 310 to the appropriate one of a test generator 241, a test replacer 242, or a test remover 243. The test generator 241 is configured to automatically generate a CUJ test 215 for a given CUJ 310. For example, if a CUJ test 215 does not exist for a specific CUJ 310, the test generator 241 generates a corresponding CUJ test 215 to test the specific CUJ 310. In some implementations, the test generator 241 generates the CUJ tests 215 by reverse engineering a source/production remote procedure call (RPC) trace. The test replacer 242 may be configured to replace expensive CUJ tests 215 with one or more less expensive CUJ tests 215 to reduce the consumption of system resources. The test remover 243 may be configured to remove any CUJ tests 215 that are unnecessary (i.e., do not correspond to any CUJs 310 of the software module 20), are redundant, are computationally expensive, etc. The CUJs 310 and the CUJ tests 215 may then be stored at the data store 150. The outputs from the test generator 241, the test replacer 242, and the test remover 243 can be transmitted to an intermediate test repository 244. The test repository 244 may transmit CUJ tests 215 at periodic intervals and/or as they are received from the components 241, 242, 243, depending the settings. Further, CUJ tests 215 may be indicated as needing to be deleted at the test repository 244, and those CUJ tests 215 may later be removed from the data store 150.

In some implementations, some or all of these components illustrated in FIG. 2 are stored in the integration module 205. In other implementations, the integration module is communicatively coupled to the components illustrated in the schematic view 200. Further, the arrangement of the components is for illustrative purposes only and certain components can be combined, separated, or moved. For example, though illustrated outside of the model 220, each of the CUJ module 230, the CUJ tester 235, the test generator 241, the test replacer 242, and the test remover 243 can be components of the model 220.

Figure 3:
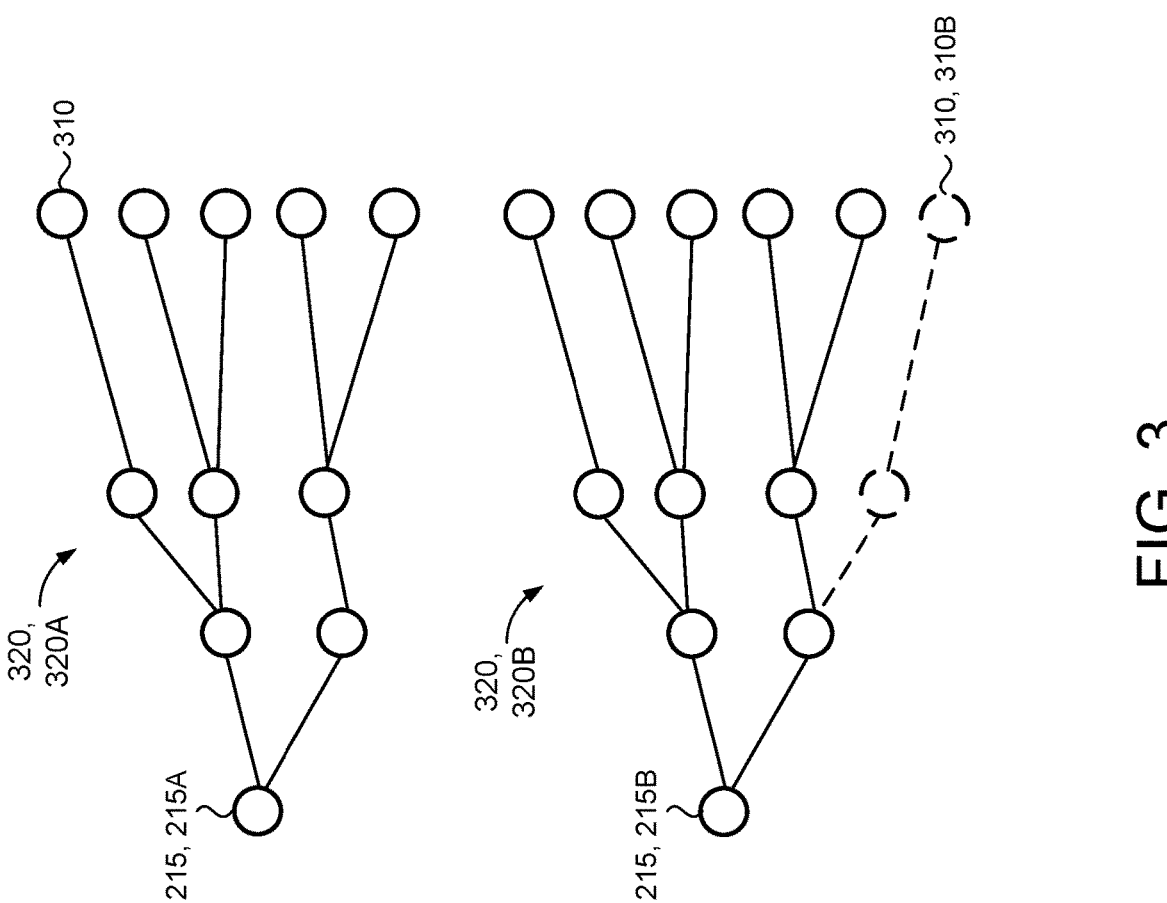
FIG. 3 is a schematic view of an example tree data structure representing critical user journey tests.

FIG. 3 illustrates a schematic view 300 of two example tree diagrams 320, 320A-B corresponding to CUJ tests 215, 215A-B. In some implementations, the tree diagrams 320 may be generated by the graph maker 221 (FIG. 2). The example tree diagrams 320 have a parent-child node structure (illustrated from left to right) where each child node has at least one parent node. Each path from parent node to child node of the tree diagram 320 may represent a CUJ 310. In the example of FIG. 3, the CUJ test 215A tests five different CUJs, as illustrated by the tree diagram 320A and the number of paths from the initial parent node to the end child nodes. The example CUJ test 215B tests six CUJ as illustrated by the tree diagram 320B. In the example of FIG. 3, the CUJ tests 215A and 215B test 5 of the same CUJs 310. However, the CUJ test 215B tests a sixth CUJ 310, 310B that CUJ test 215A does not test. In other words, the CUJ tests 215A and 215B overlap, but are not entirely redundant, as CUJ test 215B tests an additional CUJ 310B. Accordingly, the integration module 205 may delete the CUJ test 215A and keep the more comprehensive CUJ test 215B. In other implementations, the integration module 205 deletes the CUJ test 215A and CUJ test 215B, and writes a new CUJ test 215 corresponding to just the CUJ 310B.

Figure 4:
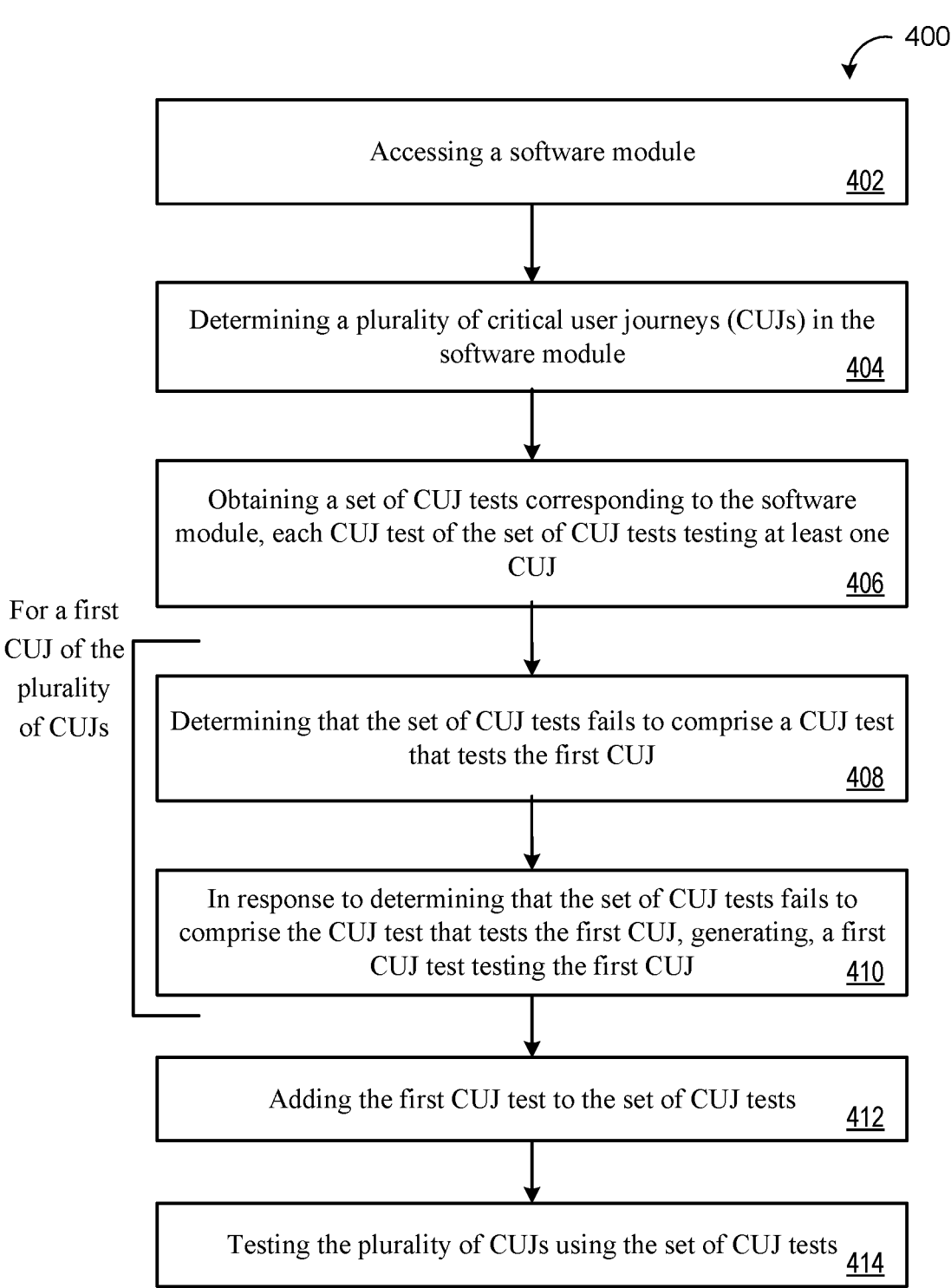
FIG. 4 a flowchart of an example arrangement of operations for a method of improving integration testing quality.

FIG. 4 is a flowchart of an exemplary arrangement of operations for a method 400 of improving integration testing quality. The method 400 can be performed by various interconnected computing devices of a computing system, such as the components of the system 100 of FIG. 1 and/or the computing device 500 of FIG. 5. At operation 402, the method 400 includes accessing a software module 20. At operation 404, the method 400 includes determining a plurality of critical user journeys 310 (CUJs) in the software module 20. At operation 406, the method 400 includes obtaining a set of CUJ tests 215 corresponding to the software module 20, each CUJ test 215 of the set of CUJ tests 215 testing at least one CUJ 310. The method 400 includes, for a first CUJ 310 of the plurality of CUJs 310, operations 408 and 410. At operation 408, the method 400 includes determining that the set of CUJ tests 215 fails to include a CUJ test 215 that tests the first CUJ 310. At operation 410, the method 400 includes, in response to determining that the set of CUJ tests 215 fails to comprise the CUJ test 215 that tests the first CUJ 310, generating a first CUJ test 215 testing the first CUJ 310. At operation 412, the method 400 includes adding the first CUJ test 215 to the set of CUJ tests 215. At operation 414, the method 400 includes testing the plurality of CUJs 310 using the set of CUJ tests 215.

Figure 5:
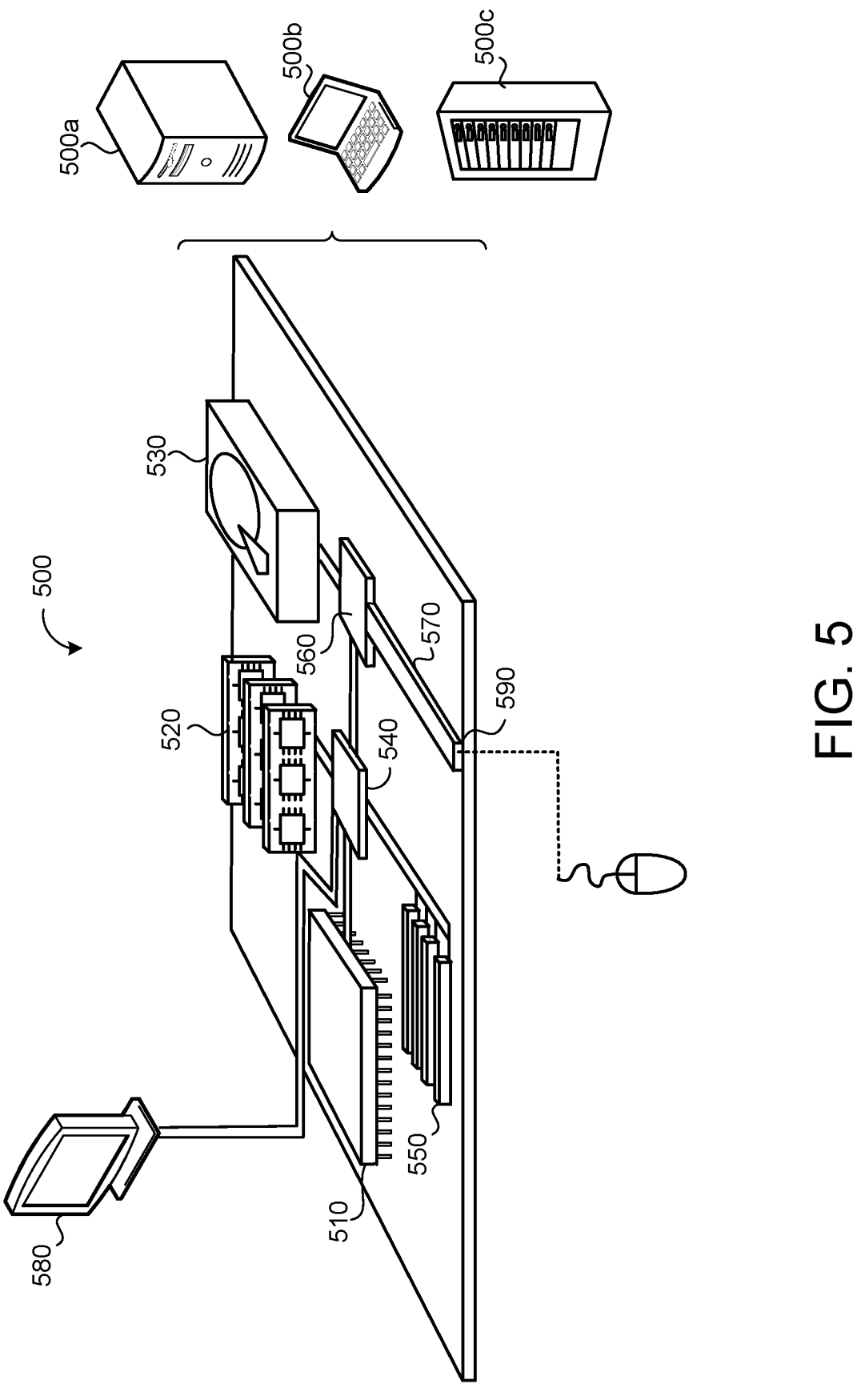
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/ controller 540 connecting to the memory 520 and high-speed expansion ports 550, and a low speed interface/ controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface

540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   accessing, by data processing hardware, a software module;
   determining, by the data processing hardware, a plurality of critical user journeys (CUJs) in the software module, each CUJ of the plurality of CUJs defining a user path for a user through the software module during interaction with the software module;
   obtaining, by the data processing hardware, a set of CUJ tests corresponding to the software module, each CUJ test of the set of CUJ tests testing at least one CUJ;
   for each respective CUJ test of the set of CUJ tests:
      generating, by the data processing hardware, a respective tree graph to represent the respective CUJ test;
      comparing, by the data processing hardware, the respective tree graph of the respective CUJ test to another respective tree graph for another respective CUJ test of the set of CUJ tests; and
      determining, by the data processing hardware and based on the comparison of the respective tree graph of the respective CUJ test to the other respective tree graph for the other respective CUJ test of the set of CUJ tests, a similarity score for the respective CUJ test and the other respective CUJ test;
   for a first CUJ of the plurality of CUJs:
      determining, by the data processing hardware, that the set of CUJ tests fails to comprise a CUJ test that tests the first CUJ; and
      in response to determining that the set of CUJ tests fails to comprise the CUJ test that tests the first CUJ, generating, by the data processing hardware, a first CUJ test testing the first CUJ;
   adding, by the data processing hardware, the first CUJ test to the set of CUJ tests; and
   testing, by the data processing hardware, the plurality of CUJs using the set of CUJ tests.

2. The method of claim 1, wherein the software module comprises an integrated software module.

3. The method of claim 1, further comprising, for a second CUJ test of the set of CUJ tests:
   determining that the second CUJ test is redundant based on a third CUJ test of the set of CUJ tests; and
   removing the second CUJ test from the set of CUJ tests.

4. The method of claim 3, wherein determining that the second CUJ test is redundant based on the third CUJ test comprises determining that the at least one CUJ of the plurality of CUJs tested by the second CUJ test is also tested by the third CUJ test.

5. The method of claim 1, further comprising, for a second CUJ test of the set of CUJ tests:

determining that at least one CUJ of the plurality of CUJs tested by the second CUJ test does not belong to the plurality of CUJs; and removing the second CUJ test from the set of CUJ tests.

6. The method of claim 1, wherein generating the first CUJ test testing the first CUJ comprises reverse engineering a remote procedure call (RPC) trace corresponding to the first CUJ test.

7. The method of claim 1, further comprising clustering the CUJ tests of the set of CUJ tests based on respective similarity scores.

8. The method of claim 1, further comprising ranking the plurality of CUJs based on an occurrence frequency.

9. A system comprising:

data processing hardware; and memory hardware in communication with the data processing hardware, the memory hardware storing instructions that when executed on the data processing hardware cause the data processing hardware to:

access a software module;

determine a plurality of critical user journeys (CUJs) in the software module, each CUJ of the plurality of CUJs defining a user path for a user through the software module during interaction with the software module;

obtain a set of CUJ tests corresponding to the software module, each CUJ test of the set of CUJ tests testing at least one CUJ;

for each respective CUJ test of the set of CUJ tests:

generate a respective tree graph to represent the respective CUJ test;

compare the respective tree graph of the respective CUJ test to another respective tree graph for another respective CUJ test of the set of CUJ tests; and determine, based on the comparison of the respective tree graph of the respective CUJ test to the other respective tree graph for the other respective CUJ test of the set of CUJ tests, a similarity score for the respective CUJ test and the other respective CUJ test;

for a first CUJ of the plurality of CUJs:

determine that the set of CUJ tests fails to comprise a CUJ test that tests the first CUJ; and in response to determining that the set of CUJ tests fails to comprise the CUJ test that tests the first CUJ, generate, a first CUJ test testing the first CUJ;

add the first CUJ test to the set of CUJ tests; and test the plurality of CUJs using the set of CUJ tests.

10. The system of claim 9, wherein the software module comprises an integrated software module.

11. The system of claim 9, wherein the instructions further cause the data processing hardware to, for a second CUJ test of the set of CUJ tests:

determine that the second CUJ test is redundant based on a third CUJ test of the set of CUJ tests; and remove the second CUJ test from the set of CUJ tests.

12. The system of claim 11, wherein the instructions that cause the data processing hardware to determine that the second CUJ test is redundant based on the third CUJ test further cause the data processing hardware to determine that the at least one CUJ of the plurality of CUJs tested by the second CUJ test is also tested by the third CUJ test.

13. The system of claim 9, wherein the instructions further cause the data processing hardware to, for a second CUJ test of the set of CUJ tests:

determine that at least one CUJ of the plurality of CUJs tested by the second CUJ test does not belong to the plurality of CUJs; and remove the second CUJ test from the set of CUJ tests.

14. The system of claim 9, wherein the instructions that cause the data processing hardware to generate the first CUJ test testing the first CUJ further cause the data processing hardware to reverse engineer a remote procedure call (RPC) trace corresponding to the first CUJ test.

15. The system of claim 9, wherein the instructions further cause the data processing hardware to cluster the CUJ tests of the set of CUJ tests based on respective similarity scores.

16. The system of claim 9, wherein the instructions further cause the data processing hardware to rank the plurality of CUJs based on an occurrence frequency.

* * * * *